(12) United States Patent
Hanks

(10) Patent No.: US 7,196,715 B2
(45) Date of Patent: Mar. 27, 2007

(54) SPEED CONTROL USING DRIVE CURRENT PROFILE

(75) Inventor: Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 10/454,567

(22) Filed: Jun. 3, 2003

(65) Prior Publication Data

US 2004/0141045 A1 Jul. 22, 2004

Related U.S. Application Data

(63) Continuation-in-part of application No. 10/347,074, filed on Jan. 17, 2003.

(51) Int. Cl.
*B41J 2/435* (2006.01)
(52) U.S. Cl. ..................................................... 347/224
(58) Field of Classification Search .. 360/78.06–78.11, 360/78.14, 73.02, 77.04; 369/52.1, 53.4, 369/53.29, 53.39; 347/2, 224–225; 713/324
See application file for complete search history.

(56) References Cited

U.S. PATENT DOCUMENTS

| | | | |
|---|---|---|---|
| 4,027,217 A | 5/1977 | Harman | |
| 4,556,966 A * | 12/1985 | Bricot et al. | 369/52.1 |
| 4,967,286 A | 10/1990 | Nomula et al. | |
| 5,182,741 A | 1/1993 | Maeda et al. | |
| 5,398,231 A | 3/1995 | Shin et al. | |
| 5,412,809 A * | 5/1995 | Tam et al. | 713/324 |
| 5,498,509 A | 3/1996 | Shin et al. | |
| 5,608,717 A | 3/1997 | Ito et al. | |
| 5,608,718 A | 3/1997 | Schiewe | |
| 5,627,895 A | 5/1997 | Owaki | |
| 5,675,570 A | 10/1997 | Ohira et al. | |
| 5,688,173 A | 11/1997 | Kitahara et al. | |
| 5,729,533 A | 3/1998 | Marquardt | |
| 5,745,457 A | 4/1998 | Hayashi et al. | |
| 5,748,607 A | 5/1998 | Ohira et al. | |
| 5,751,671 A | 5/1998 | Koike et al. | |
| 5,764,430 A | 6/1998 | Ottesen et al. | |
| 5,766,495 A | 6/1998 | Parette | |
| 5,781,221 A | 7/1998 | Wen et al. | |
| 5,846,131 A | 12/1998 | Kitahara | |
| 5,875,156 A | 2/1999 | Ito et al. | |
| 5,877,913 A * | 3/1999 | Shitara | 360/73.02 |
| 5,915,858 A | 6/1999 | Wen | |
| 5,949,752 A | 9/1999 | Glynn et al. | |
| 5,958,651 A | 9/1999 | Van Hoof et al. | |
| 5,967,676 A | 10/1999 | Cutler et al. | |
| 5,997,976 A | 12/1999 | Mueller et al. | |
| 6,019,151 A | 2/2000 | Wen et al. | |

(Continued)

FOREIGN PATENT DOCUMENTS

DE 3139543 4/1983

(Continued)

*Primary Examiner*—Hai Pham
(74) *Attorney, Agent, or Firm*—Nathan Rieth

(57) ABSTRACT

Timing information from the label side of an optical disc is used to generate a drive current profile. The drive current profile can be applied to a spindle motor in order to maintain a rotational speed of the optical disc in the absence of the timing information.

33 Claims, 8 Drawing Sheets

U.S. PATENT DOCUMENTS

| | | |
|---|---|---|
| 6,026,066 A | 2/2000 | Maezawa |
| 6,034,930 A | 3/2000 | Kitahara |
| 6,074,031 A | 6/2000 | Kahle |
| 6,102,800 A | 8/2000 | Kitahara et al. |
| 6,104,677 A | 8/2000 | Kirihara et al. |
| 6,124,011 A | 9/2000 | Kern |
| 6,144,517 A * | 11/2000 | Watanabe et al. ........ 360/77.04 |
| 6,160,789 A | 12/2000 | Abraham |
| 6,202,550 B1 | 3/2001 | Lee et al. |
| 6,264,295 B1 | 7/2001 | Bradshaw et al. |
| 6,270,176 B1 | 8/2001 | Kahle |
| 6,295,261 B1 | 9/2001 | Kim |
| 6,317,399 B1 | 11/2001 | Ohtani et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B2 | 9/2002 | Chan |
| 6,469,969 B2 | 10/2002 | Carson et al. |
| 6,736,475 B2 * | 5/2004 | Youngberg et al. ............ 347/2 |
| 2002/0191517 A1 | 12/2002 | Honda et al. |

FOREIGN PATENT DOCUMENTS

| | | |
|---|---|---|
| EP | 0532997 | 3/1993 |
| WO | PCT/US2004/015998 | 9/2004 |

* cited by examiner

| Clock Edges 404 | ID | R1 | R2 | • • • • | OD | Hall Edges 408 |
|---|---|---|---|---|---|---|
| $CK_1$ | $C_{00}$ | $C_{10}$ | $C_{20}$ | • • • • | $C_{N0}$ | $H_0$ |
| $CK_2$ | $C_{01}$ | $C_{11}$ | $C_{21}$ | • • • • | $C_{N1}$ | |
| • • • • | • • • • | • • • • | • • • • | • • • • • • • • • • • • • • • • | • • • • | $H_1$ |
| $CK_N$ | $C_{0N}$ | $C_{1N}$ | $C_{2N}$ | • • • • | $C_{NN}$ | $H_N$ |

DRIVE CURRENT PROFILE 242

SPEED CONTROL USING DRIVE CURRENT PROFILE

RELATED APPLICATIONS

This patent application is a continuation-in-part of U.S. patent application Ser. No. 10/347,074, which was filed on Jan. 17, 2003, and titled "Radial Position Registration For A Trackless Optical Disc Surface", and which is hereby incorporated by reference.

BACKGROUND

An optical disc, such as a compact disc (CD), is an electronic data storage medium that can be written to and read using a low-powered laser beam. Optical disc technology first appeared in the marketplace with the CD, which is typically used for electronically recording, storing, and playing back audio, video, text, and other information in digital form. A digital versatile disc (DVD) is another more recent type of optical disc that is generally used for storing and playing back movies because of its ability to store much more data in the same space as a CD.

Compact Discs were initially a read-only storage medium that stored digital data as a pattern of bumps and flat areas impressed into a piece of clear polycarbonate plastic through a complex manufacturing process. However, average consumers can now burn their own CDs with CD players capable of burning digital data into CD-Rs (CD-recordable discs) and CD-RWs (CD-rewritable discs).

Methods for labeling the non-data side of such optical discs with text and images, for example, have continued to develop as consumers desire more convenient ways to identify their own recorded discs. Basic methods for labeling a disc include physically writing on the non-data side with a permanent marker (e.g., a Sharpie marker) or printing out a paper sticker label and sticking it onto the non-data side of the disc. Other physical marking methods developed for implementation in conventional CD players include ink jet, thermal wax transfer, and thermal dye transfer methods. Still other methods use the laser in a conventional CD player to mark a specially prepared CD surface. Such methods apply equally to labeling CDs and DVDs.

A label image can be rendered on the label surface (i.e., the non-data side, or top side) of an optical disc by marking the label surface with a laser beam along concentric circular tracks around the disc. For each track, spots of constant size and optical density are marked by the laser according to the marking data for that track. The rotational speed of the spindle is adjusted to correspond with the time it takes for the media (i.e., the coating on the disc) to respond (i.e., change color) to the energy from the laser. However, the media response time can require a spindle speed slow enough that it puts a constraint on the rotational speed accuracy of the spindle motor.

A CD drive typically employs an inexpensive 3-phase motor with an integer position encoder as its motor drive method. Three built-in Hall effect encoders provide speed sensing through 18 feedback positions that exploit the rising and falling edges of the Hall sensor signals. At typical rotational speeds, on the order of 1000 RPM, speed accuracy can be adequately maintained with this degree of feedback. However, at slower rotational speeds such as speeds that are conducive to marking the label surface of a disc, the number of feedback positions from the Hall sensors is too few to maintain speed accuracy. Therefore, a more reliable and repeatable speed control is needed.

SUMMARY

Timing information from the label side of an optical disc is used to generate a drive current profile. The drive current profile can be applied to a spindle motor in order to maintain a rotational speed of the optical disc in the absence of the timing information.

BRIEF DESCRIPTION OF THE DRAWINGS

The same reference numbers are used throughout the drawings to reference like components and features.

DETAILED DESCRIPTION

Overview

The following discussion is directed to disc media marking systems and methods that facilitate optical disc labeling by accurately controlling the rotational speed of the spindle, particularly at low RPM. A disc system generates timing information by reading (i.e., with a laser) a reflectivity pattern located on the label side of an optical disc. The timing information provides fine timing increments that enable the system to control the spindle speed at very low RPM's. During a learning phase, the system records the average drive current applied to a spindle motor at each of the fine timing increments while maintaining a particular rotational spindle speed. A drive current profile generated from the recorded drive current values includes signal edge data from Hall sensors that synchronizes the current values in the profile with absolute angular positions of the spindle. When the learning phase is complete and the system no longer has access to the reflectivity pattern on the optical disc (e.g., when the laser is marking the label area of the disc), the current profile is used to control drive current applied to the spindle motor. The drive current profile maintains the spindle speed while signal edge data received from Hall sensors keeps the angular position of the spindle properly synchronized with the drive current profile.

Exemplary System Environment

Figure 1:
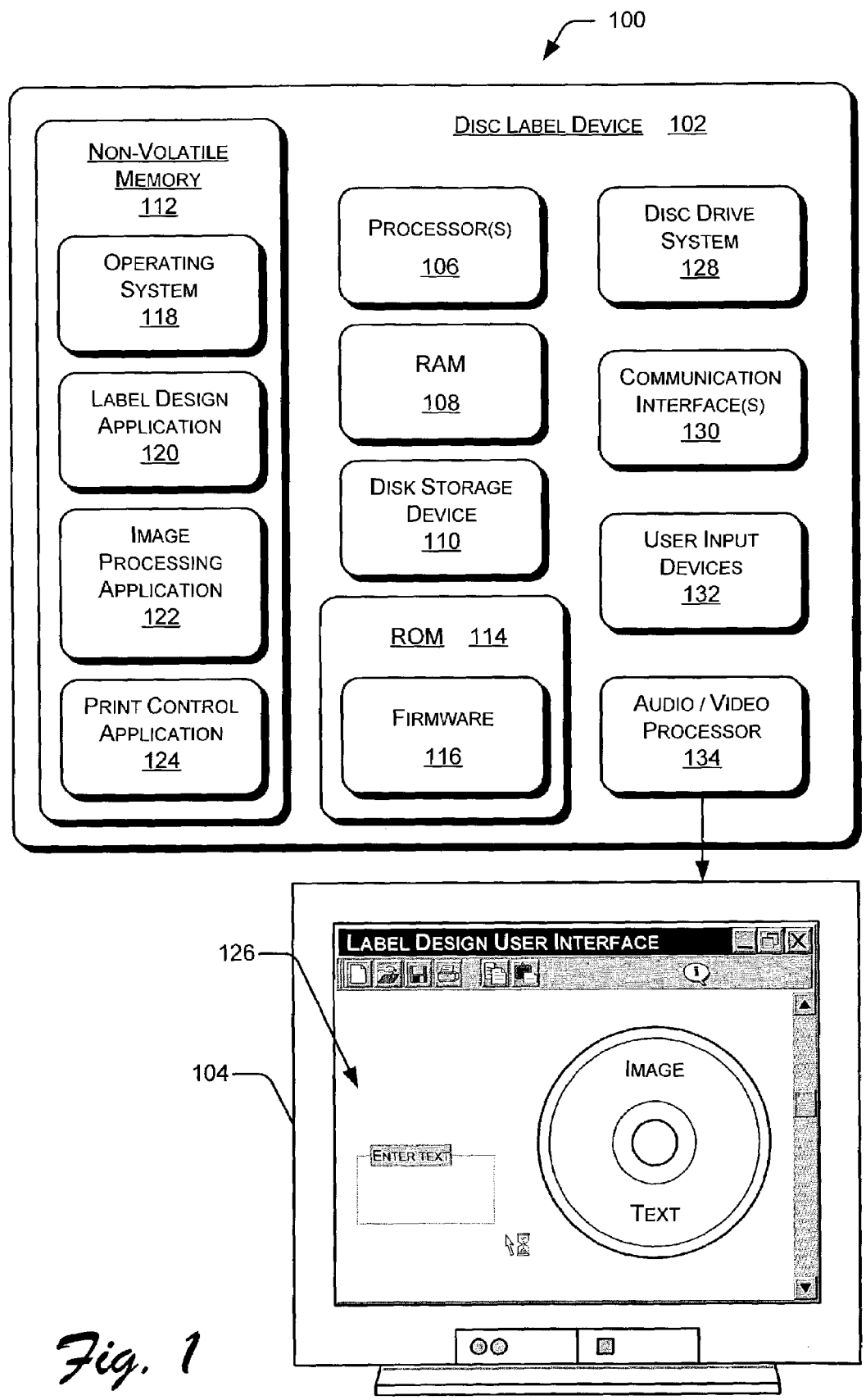
FIG. 1 illustrates an exemplary disc media marking system.

FIG. 1 illustrates an exemplary disc media marking system 100 suitable for implementing adaptive feed forward spindle speed control. The exemplary disc media marking system 100 includes a disc media marking device 102 and a display device 104. The disc media marking device 102 can be implemented as a stand-alone appliance device for labeling disc media. Alternatively, the disc media marking device 102 can be integrated as part of an optical media player or drive, such as a writable compact disc (CD) player that is implemented to label an optical disc as well as record data onto a CD-R (CD-recordable disc) and/or a CD-RW (CD-rewritable disc). Such writable CD devices may include, for example, a stand-alone audio CD player that is a peripheral component in an audio system, a CD-ROM drive integrated as standard equipment in a PC (personal computer), a DVD (digital versatile disc) player, and any number of similar embodiments.

Disc media marking device 102 includes one or more processors 106 (e.g., any of microprocessors, controllers, and the like) that process various instructions to control the operation of disc media marking device 102 and communicate with other electronic and computing devices. Disc media marking device 102 can be implemented with one or more memory components, examples of which include a random access memory (RAM) 108, a disk storage device 110, and non-volatile memory 112 (e.g., any one or more of a read-only memory (ROM) 114, flash memory, EPROM, EEPROM, etc.).

Disk storage device 110 can include any type of magnetic or optical storage device, such as a hard disk drive, a magnetic tape, a recordable and/or rewriteable compact disc (CD), a DVD, DVD+RW, and the like. The one or more memory components provide data storage mechanisms to store various information and/or data such as configuration information for disc media marking device 102, graphical user interface information, and any other types of information and data related to operational aspects of disc media marking device 102. Alternative implementations of disc media marking device 102 can include a range of processing and memory capabilities, and may include any number of differing memory components than those illustrated in FIG. 1.

Disc media marking device 102 includes a firmware component 116 that is implemented as a permanent memory module stored on ROM 114, or with other components in disc media marking device 102, such as a component of a processor 106. Firmware 116 is programmed and distributed with disc media marking device 102 to coordinate operations of the hardware within disc media marking device 102 and contains programming constructs used to perform such operations.

An operating system 118 and one or more application programs can be stored in non-volatile memory 112 and executed on processor(s) 106 to provide a runtime environment. A runtime environment facilitates extensibility of disc media marking device 102 by allowing various interfaces to be defined that, in turn, allow the application programs to interact with disc media marking device 102. In this example, the application programs include a label design application 120, an image processing application 122, and a print control application 124.

The label design application 120 generates a label design user interface 126 for display on display device 104 from which a user can create a label image to be rendered on a disc media, such as on an optical disc. A user can specify, or otherwise drag-and-drop text, a bitmap image for background, a digital photo, a graphic or symbol, and/or any combination thereof to create the label image on the user interface 126.

Figure 2:
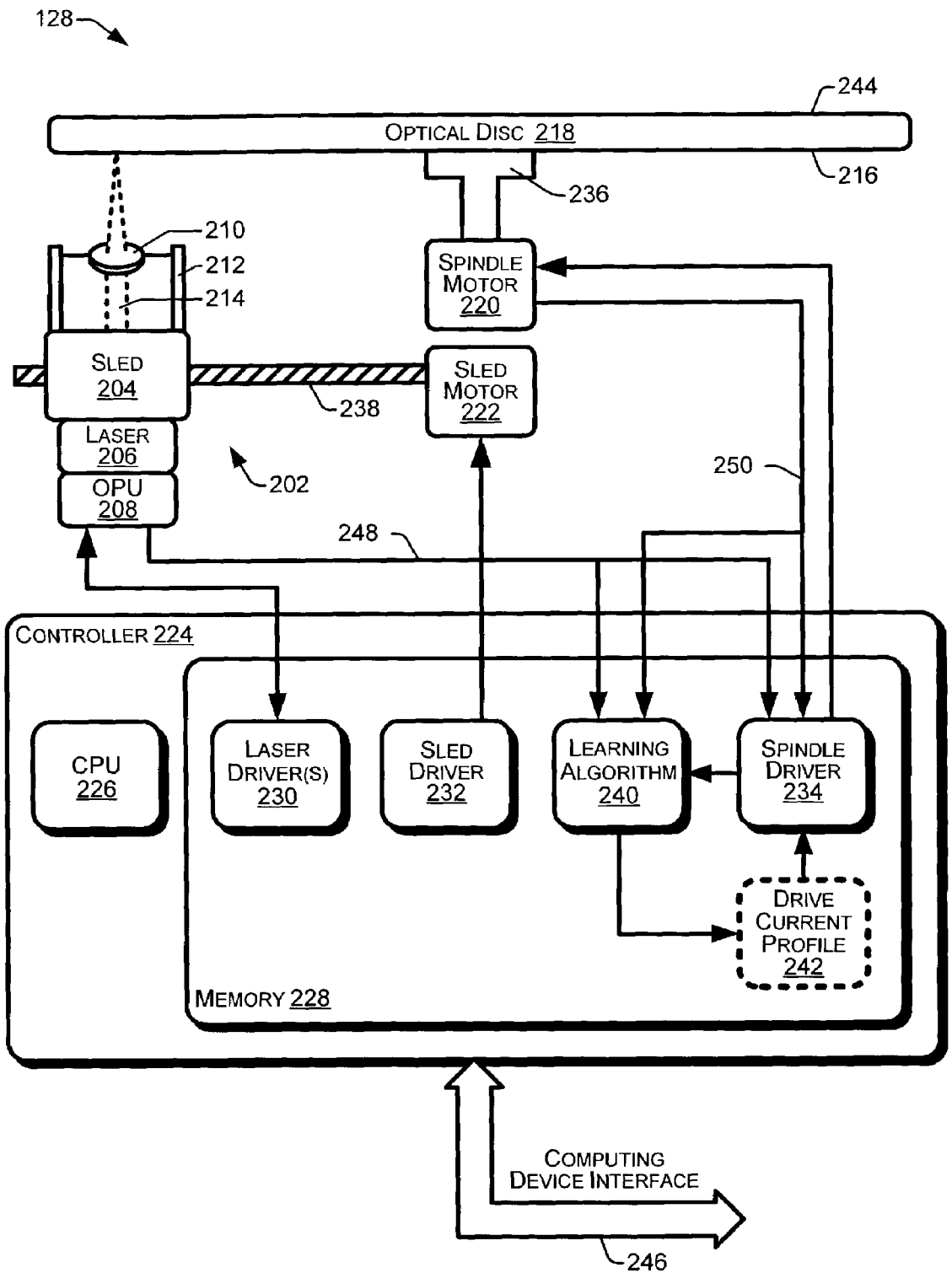
FIG. 2 illustrates an exemplary embodiment of a disc drive system as a component of the exemplary disc media marking system of FIG. 1.
Figure 3:
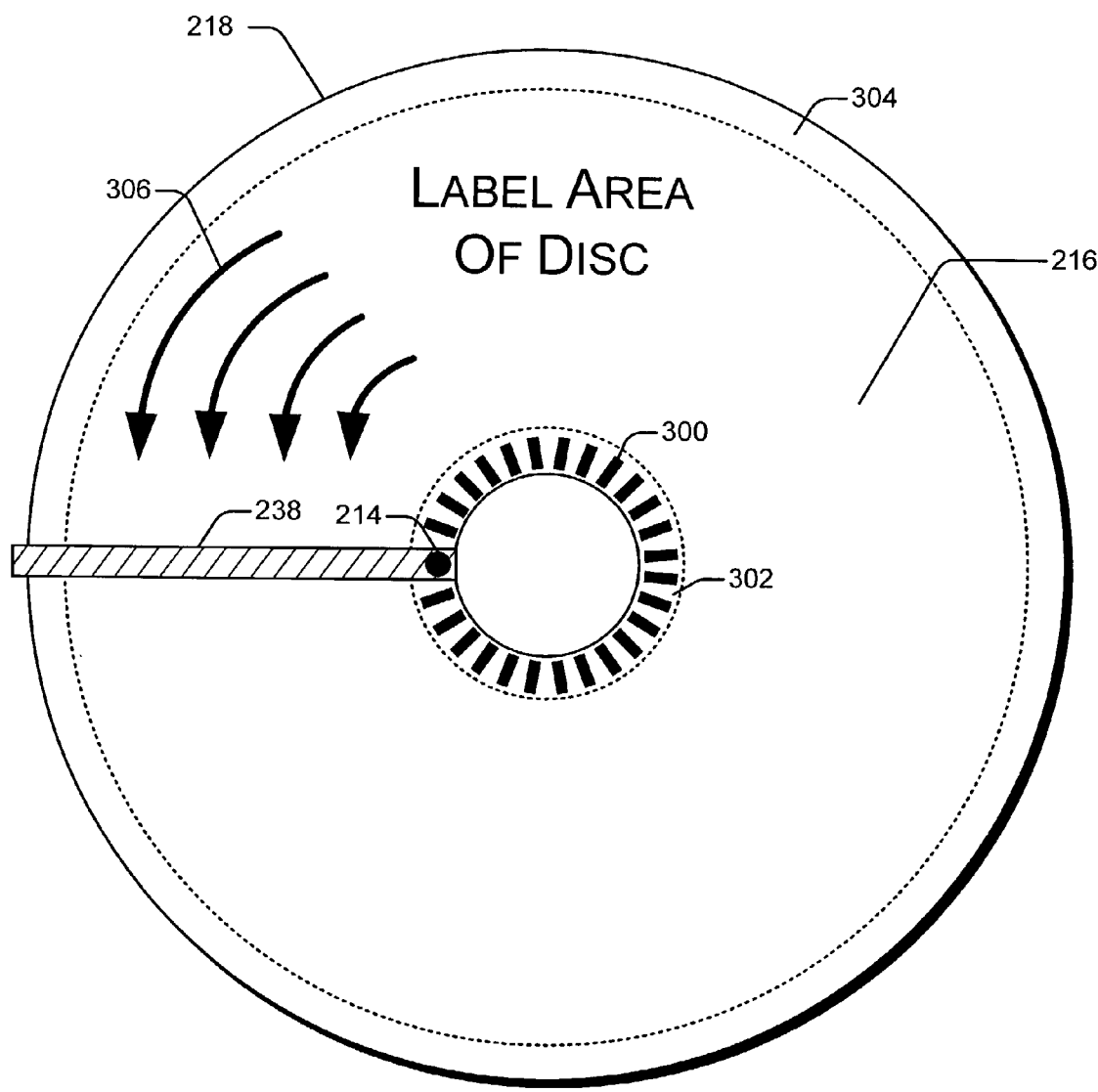
FIG. 3 illustrates an exemplary embodiment of optical disc media having an exemplary reflectivity pattern.

The image processing application 122 processes the label image created with the label design user interface 126 to produce a data stream of label image data and laser control data to control rendering the image on the concentric circular tracks of a disc media, such as disc media 218 (FIGS. 2 & 3). For example, a continuous tone RGB (red, green, and blue) rectangular raster graphic of the label image can be converted to the concentric circular tracks. The curved raster is color mapped and separated into the printing color channels KCMY (black, cyan, magenta, and yellow), or grayscale. This data stream is formatted as laser control data and is augmented with other control commands to control the disc media marking device 102 rendering a label on the disc media 218 (FIGS. 2 & 3). A label file is generated that can be communicated to a controller where the label file is parsed to control a labeling mechanism. Alternatively, the concentric circular tracks may be generated and streamed to the disc media marking device 102 one track at a time to utilize host processing with the device's rendering process.

The print control application 124 determines the radius of the first track and the subsequent track spacing. After the radius of the first track and the track spacing is determined, the print control application 124 determines which label image data will correspond to each respective track. The laser mark locations along a particular track are specified in a coordinate system where the concentric circular tracks are defined in coordinates of the radial distance and the distance along each respective track.

Disc media marking device 102 includes a disc drive system 128 that can be implemented to mark on a surface of a disc media (i.e., optical disc), such as to render a label image on a label surface 216 (e.g., the non-data side) of optical disc 218 (FIGS. 2 & 3). The disc drive system 128 is further described below with reference to FIG. 2.

Disc media marking device 102 further includes one or more communication interfaces 130 which can be implemented as any one or more of a serial and/or parallel interface, as a wireless interface, any type of network interface, and as any other type of communication interface. A wireless interface enables disc media marking device 102 to receive control input commands and other information from an input device, such as from a remote control device or from another infrared (IR), 802.11, Bluetooth, or similar RF input device. A network interface provides a connection between disc media marking device 102 and a data communication network which allows other electronic and computing devices coupled to a common data communication network to send label image data and other information to disc media marking device 102 via the network. Similarly, a serial and/or parallel interface provides a data communication path directly between disc media marking device 102 and another electronic or computing device.

Disc media marking device 102 may include user input devices 132 that can include a keyboard, pointing device, selectable controls on a user control panel, and/or other mechanisms to interact with, and to input information to disc media marking device 102. Disc media marking device 102 also includes an audio/video processor 134 that generates display content for display on display device 104, and generates audio content for presentation by a presentation device, such as one or more speakers (not shown). The audio/video processor 134 can include a display controller that processes the display content to display corresponding images on display device 104. A display controller can be implemented as a graphics processor, microcontroller, integrated circuit, and/or similar video processing component to process the images. Video signals and audio signals can be communicated from disc media marking device 102 to display device 104 via an RF (radio frequency) link, S-video link, composite video link, component video link, or other similar communication link.

Although shown separately, some of the components of disc media marking device 102 may be implemented in an application specific integrated circuit (ASIC). Additionally, a system bus (not shown) typically connects the various components within disc media marking device 102. A system bus can be implemented as one or more of any of several types of bus structures, including a memory bus or memory controller, a peripheral bus, an accelerated graphics port, or a local bus using any of a variety of bus architectures. Further, disc media marking device 102 may share a system bus with a host processor.

Exemplary Embodiments

FIG. 2 illustrates an exemplary embodiment of the disc drive system 128 which is shown in FIG. 1 as a component of the exemplary disc media marking device 102. The disc drive system 128 has a laser assembly 202 that includes a sled 204 which supports a laser 206, an optical pickup unit (OPU) 208, a laser focusing lens 210, and lens supports 212.

A laser beam 214 is generated by the laser 206 and focused onto a label surface 216 of optical disc media 218. The laser beam 214 creates laser marks that correspond to label image data to render an image of the label on the optical disc media 218.

The disc drive system 128 includes a spindle motor 220, a sled motor 222, and a controller 224. In general, controller 224 may be implemented as a printed circuit board employing a combination of various components discussed above with respect to the disc media marking system 100 of FIG. 1. Accordingly, controller 224 includes a processor 226 for processing computer/processor-executable instructions from various components stored in a memory 228. Processor 226 is typically one of the one or more processors 106 discussed above with respect to the disc media marking system 100 of FIG. 1. Likewise, memory 228 is typically the non-volatile memory 112 and/or firmware 116 from the disc media marking system 100 of FIG. 1.

A laser driver 230, sled driver 232, and spindle driver 234 are stored in memory 228 and executable on processor 226. Although these components are represented in the FIG. 2 embodiment as software components stored in memory 228 and executable on processor 226, they may also be firmware or hardware components.

In general, spindle driver 234 drives the spindle motor 220 to control a rotational speed of disc 218 via spindle 236. Spindle driver 234 operates in conjunction with sled driver 232 which drives the sled motor 222 to control the radial position of laser assembly 202 with respect to disc 218 along a sled drive mechanism 238. In one implementation, the rotational speed of disc 218 and the radial position of laser assembly 202 are controlled such that laser marks are written on the disc 218 as the label surface 216 moves past the laser beam 214 at a constant linear velocity. The spindle driver 234 is discussed more specifically below with respect to implementing adaptive feed forward spindle speed control through interaction with OPU 208, a learning algorithm 240, a drive current profile 242, and spindle motor 220.

The laser driver 230 controls the firing of laser beam 214 to write laser marks corresponding to a label image on optical disc media 218. Optical pickup unit (OPU) 208 can be implemented as a photodetector that provides laser focus feedback to the laser driver 230. Additionally, the laser driver 230 controls the intensity of the laser beam 214 to read data maintained on the data side 244 of the optical disc 218 when the disc is positioned such that the data side 244 passes over the laser beam 214.

Computing device interface 246 interfaces the controller 224 of the disc drive system 128 with another electronic or computing device to receive label image data or a label file (not shown). The computing device interface 246 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disk drive. ATAPI devices generally include CD-ROM drives, CD-recordable drives, CD-rewritable drives, DVD (digital versatile disc) drives, tape drives, super-floppy drives (e.g., ZIP and LS-120), and the like.

As mentioned above, spindle driver 234 implements adaptive feed forward spindle speed control through interaction with OPU 208, learning algorithm 240, drive current profile 242, and spindle motor 220. In general, the adaptive feed forward spindle speed control enables accurate control of the spindle speed (and thus, the optical disc 218) even at very low RPM's. Reliable control at low RPM's alleviates various problems encountered when marking the label surface 216 of optical disc 218 with a laser beam 214. Such problems relate to the significant time that may be needed for the disc media label surface 216 to change color in response to the laser beam 214.

Prior methods for addressing problems related to media response time include repeatedly marking the same spot on numerous rotations/passes of the optical disc 218 while maintaining a typical operational rotational speed of the disc 218. However, this prior method requires optical media discs 218 that employ slower reacting thermo-chromatic or photo-chromatic chemistry and presumes that there will be no fading of optical density between passes (i.e., rotations of the disc 218). Accordingly, an ability to reliably control the spindle speed (and thus, the optical disc 218 speed) at very low RPM's is advantageous for labeling optical discs 218 in a disc media marking device 102.

During normal operation of disc drive system 128, such as while retrieving data from optical disc 218, typical rotational spindle speeds are on the order of 1000 RPM. However, when labeling the label surface 216 of optical disc 218, a minimum rotational spindle speed conducive to marking the outer diameter of the label surface 216 may be on the order of, for example, 25 RPM. This minimum rotational spindle speed is associated with a desired constant linear velocity of the label surface 216 of optical disc 218 moving past the laser beam 214 as the laser beam 214 marks the outer diameter of the disc 218. To maintain a desired constant linear velocity during labeling, the rotational speed of the spindle increases as the laser moves toward the inner diameter of the disc 218, until it reaches a local maximum rotational spindle speed for disc labeling. Thus, although the linear velocity of the label surface 216 relative to the laser beam 214 may remain constant during labeling of disc 218, the rotational spindle speed fluctuates from a relatively low minimum RPM (e.g., 25 RPM) to a relatively low maximum RPM (e.g., 75 RPM).

Accurately maintaining the relatively low, minimum and maximum rotational spindle speeds desired for labeling a disc 218 is difficult using currently available signal information from Hall sensors in a spindle motor 220. In a typical 3-phase spindle motor 220 having 12 rotor poles, there are 18 feedback positions generated from a combination of 3 Hall sensors and the 12 rotor poles. A rising and falling signal edge for each feedback position results in 36 Hall signal edges generated during one rotation of the spindle 236 (which generally corresponds to one rotation of disc 218) that a disc drive system 128 can use to control the spindle speed. Although this amount of feedback is adequate to control the spindle speed at typical operating speeds (e.g., on the order of 1000 RPM), it is not adequate to accurately maintain the low spindle speeds desired when labeling a disc 218.

Therefore, in a learning phase of the adaptive feed forward spindle speed control, spindle driver 234 uses fine timing information to control drive current to spindle motor 220. The fine timing information, represented by line 248 in FIG. 2, enables the spindle driver 234 to control the spindle speed even at very low RPM's. The fine timing information is generated from a reflectivity pattern located on optical disc 218, as shown in FIG. 3.

FIG. 3 illustrates an example of an optical disc 218 that has an exemplary reflectivity clock pattern 300 which acts as a clock track to facilitate the generation of fine timing information useful for controlling the rotational speed of a spindle 236 at very low RPM's. The reflectivity clock pattern 300 is located on the label side 216 of the disc 218 at the inner diameter 302 of the disc 218. However, the reflectivity pattern 300 is not limited to being located at the inner diameter 302 of disc 218. It might also be located elsewhere on the label side 216 of the disc 218, preferably in any area that does not interfere with the label area of the disc, such as at the outer diameter 304. In addition, although the reflectivity pattern 300 of FIG. 3 is illustrated as a pattern of spokes, it is not necessarily limited to such a pattern. Thus, other reflectivity patterns that might achieve a similar clock track effect as described herein may also be appropriate for use as a reflectivity pattern 300.

The patterns of light and dark in the reflectivity pattern 300 can be formed on disc 218 by various processes such as silk screening, etching or embossing. The dark patterned areas of reflectivity pattern 300 represent dull areas of low reflectivity on disc 218, while the light patterned areas (i.e., the areas that are not marked) represent shiny areas of high reflectivity on disc 218. In general, scanning areas of varying reflectivity on a disc 218 with a laser 214 generates a reflectivity signal through the OPU 208 (FIG. 2) whose amplitude changes in response to the changing reflectivity of the area of the disc 218 being scanned.

FIG. 3 also provides an illustration of a laser beam 214 spot at the inner diameter 302 of disc 218, as well as an imaginary path representing the sled drive mechanism 238 of disc drive system 128 along which a laser beam 214 traverses the radius of disc 218 between the inner diameter 302 and outer diameter 304 while marking the label side 216 of the disc 218.

Figures 4, 5:
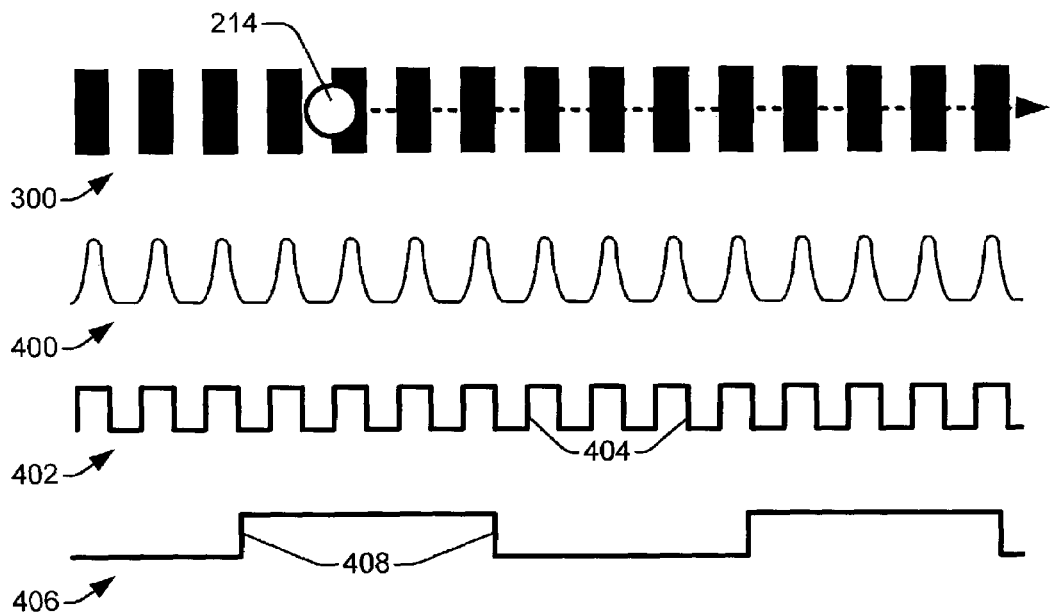
FIG. 4 illustrates an exemplary timing diagram that shows an example reflectivity signal, its corresponding timing/clock signal, and an example Hall sensor signal in relation to an example reflectivity pattern.
FIG. 5 illustrates an exemplary drive current profile.

FIG. 4 represents an example of a timing diagram that shows an example reflectivity signal 400 and corresponding fine timing/clock signal 402 that may be generated through OPU 208 as the laser 214 traverses the reflectivity pattern 300. Each signal edge 404 of the fine timing/clock signal 402 is associated with an angular position of the rotating disc 218. FIG. 4 additionally shows an example of Hall sensor signal 406 information from Hall sensors in spindle motor 220. Each signal edge 408 of the Hall sensor signal is associated with an angular position of the spindle 236 on which the disc 218 rotates. The Hall signal edges 408 provide reference points for the finer clock signal edges 404 and serve to synchronize the angular position of the spindle 236, via clock signal edges 404, with drive current values within a drive current profile 242, as further discussed below.

Referring to FIGS. 2, 3, and 4, during a learning phase of the adaptive feed forward spindle speed control, the laser beam 214 is positioned at the inner diameter 302 of disc 218 such that the reflectivity pattern 300 will pass over the laser beam 214 as the disc 218 rotates. As the disc 218 rotates in the direction of arrows 306, for example, the OPU 208 on disc drive system 128 picks up the reflected light from reflectivity pattern 300 and generates a reflectivity signal 400. The OPU 208 processes the reflectivity signal 400 through, for example, a comparator circuit (not shown), resulting in a fine clock signal 402, also represented through line 248 in FIG. 2. The spindle driver 234 receives the fine clock information 248, 402, from OPU 208 and uses it to determine the rotational speed of disc 218, which in turn indicates the rotational speed of spindle 236. The fine clock information 248, 402, enables the spindle driver 234 to accurately maintain the rotational spindle speed at a low RPM conducive to writing a label on disc 218. The spindle driver 234 maintains a desired rotational spindle speed by controlling the level of drive current driving the spindle motor 220.

In addition to receiving the fine clock information 248, 402, spindle driver 234 also receives Hall sensor information 250 from spindle motor 220. An example of the Hall sensor information is shown in FIG. 4 as signal 406. The Hall sensor signal 406 is intended to represent an integrated signal that combines data from 3 Hall sensors in spindle motor 220. As discussed above, a typical 3-phase spindle motor 220 having 12 rotor poles provides 18 feedback positions and 36 Hall signal edges. The Hall sensor signal 406 shown in FIG. 4 is intended to indicate that there are numerous fine clock signal edges 404 that occur between each of the Hall signal edges 408. Thus, the Hall sensor signal 406 shown in FIG. 4 illustrates only 2 Hall sensor feedback positions (i.e., 4 Hall signal edges 408) relative to the much finer clock information 402. Each Hall signal edge 408 represents an absolute angular position of the spindle 236 as it rotates from spindle motor 220. It is noted that FIG. 4 is intended only as an example, and that the number of Hall signal edges 408 relative to the clock signal edges 404 from the fine clock signal 402 may vary significantly from what is illustrated in FIG. 4.

During a learning phase of the adaptive feed forward spindle speed control, learning algorithm 240 (FIG. 2) receives the fine clock information 248, 402, from OPU 208, as well as drive current information and Hall sensor signal 250, 406 information from spindle driver 234. The learning algorithm 240 uses this information to create a drive current profile 242. The drive current profile 242 can be represented as a table of information such as that shown in FIG. 5.

The drive current profile 242 of FIG. 5 includes recorded drive current data represented as current values $C_{00}-C_{0N}$ located in a column labeled ID. The ID column represents current values that are recorded during a learning phase while the laser 214 traverses the reflectivity pattern 300 at the inner diameter 302 of disc 218. The drive current profile 242 of FIG. 5 also includes interpolated drive current data represented as current values $C_{10}-C_{NN}$ located in columns labeled $R_1$–OD. Columns $R_1$, $R_2$, and so on, represent current values interpolated for radial increments in between the inner diameter 302 and outer diameter 304 of disc 218. The OD column represents current values interpolated for the outer diameter 304 of disc 218.

The learning algorithm 240 records the drive current values $C_{00}$–$C_{0N}$ in the ID column during a learning phase as the laser 214 traverses the reflectivity clock pattern 300 at the inner diameter 302 of disc 218. For each clock edge 404 (i.e., $CK_1$–$CK_N$), a corresponding drive current value is recorded in the drive current profile 242. Because each clock edge 404 (i.e., $CK_1$–$CK_N$) represents an absolute angular position of the disc 218 as it rotates on spindle 236, the absolute angular position for each clock edge 404 has a corresponding drive current value recorded within the drive current profile 242. It is noted that each drive current value (i.e., $C_{00}$–$C_{0N}$) is typically an average of several samples taken as disc 218 rotates through several rotations. Thus, the learning phase usually includes 3 or more rotations of the disc 218 which provide a number of drive current values for each clock edge 404. The learning algorithm 240 averages the drive current values for each clock edge 404 during the learning phase and records the average drive current values (i.e., $C_{00}$–$C_{0N}$) in the drive current profile 242.

The interpolated drive current values $C_{10}$–$C_{NN}$ in columns $R_1$–OD of the drive current profile 242 are not recorded values. Rather, they are values that are calculated by the learning algorithm 240. The interpolated drive current values $C_{10}$–$C_{NN}$ are used by the spindle driver 234 after the learning phase is complete. The spindle driver 234 uses current values $C_{10}$–$C_{NN}$ to maintain an appropriate rotational spindle speed during labeling of the disc 218. While the laser 214 is marking a label in the label area of the disc 218, it does not have access to the reflectivity clock pattern 300 at the inner diameter 302 of the disc 218. Thus, the learning algorithm 240 calculates the drive current values $C_{10}$–$C_{NN}$ based on an RPM of the spindle 236 for each radial increment (i.e., $R_1$, $R_2$, etc.) of the laser 214 that will maintain a constant linear velocity between the label surface 216 of the rotating disc 218 and the laser 214. To maintain a constant linear velocity for the laser as it labels the disc 218 between the inner diameter 302 and the outer diameter 304, the rotational speed (i.e., RPM) of the spindle 236 must be continually adjusted as the laser is stepped in radial increments between the inner diameter 302 and outer diameter 304. Therefore, the learning algorithm records the drive current values $C_{00}$–$C_{0N}$ at the inner diameter 302 of disc 218 and then uses the recorded values to interpolate the remaining drive current values $C_{10}$–$C_{NN}$ needed to properly adjust the rotational speed (i.e., RPM) of the spindle 236 such that a constant linear velocity is maintained between the label surface 216 and the laser 214 for each incremental labeling radius (i.e., $R_1$–OD). The actual calculation performed by the learning algorithm to determine the interpolated drive current values $C_{10}$–$C_{NN}$ will be readily known to those skilled in the art.

To the extent that the disc 218 remains registered with the spindle 236, the interpolated drive current values $C_{10}$–$C_{NN}$ in the drive current profile 242 will provide the spindle driver 234 with accurate drive information to control the rotational speed of the disc 218 during labeling. However, if the angular position of the disc 218 slips with respect to the spindle 236, the drive current values in the profile 242 will no longer match up with the exact angular position of the spindle 236 for which they were recorded (or interpolated) during the learning phase. Therefore, the drive current profile 242 also includes Hall signal edge 408 information from Hall sensor signal 406 as a way to maintain synchronization between the drive current values in the profile 242 and the absolute position of the spindle 236.

Each entry for Hall signal edge 408 information shown in FIG. 5 generally represents a Hall signal edge 408 from the timing diagram of FIG. 4. Thus, each Hall signal edge 408 is synchronized at, or close to, a particular clock edge 404. During labeling of disc 218, spindle driver 234 receives input from the drive current profile 242 that it uses to maintain appropriate spindle speed through spindle motor 220. Spindle driver 234 also receives real-time Hall sensor signal 250, 406 information (i.e., Hall signal edge 408 data) during labeling of disc 218. Spindle driver 234 compares real-time Hall signal edge 408 data with Hall signal edge 408 recorded in the drive current profile 242 to determine if the drive current values in the profile 242 are properly synchronized with the absolute position of the spindle 236. If a real-time Hall signal edge 408 does not fall in an expected location as determined from the drive current profile 242, the spindle driver 234 knows that the disc 218 has shifted out of synchronization with respect to the spindle 236. The spindle driver 234 then shifts the drive current values in the profile 242 so that they are re-synchronized with respect to the Hall signal edge 408 data.

Shifting the drive current values in the profile 242 may include advancing or delaying the application of the drive current values to spindle motor 220. Thus, for example, a current value (i.e., $C_{00}$–$C_{0N}$) with a corresponding clock edge 404 (e.g., $CK_1$–$CK_N$) in drive current profile 242, may be applied to spindle motor 220 somewhat before or somewhat after its corresponding clock edge 404 in order to properly synchronize the drive current value with the real-time Hall signal edge 408 data being received by the spindle driver 234. The advance or delay in application of the drive current value to the spindle motor 220 thereafter also affects the application of subsequent drive current values from drive current profile 242. Thus, the spindle driver 234 shifts the drive current values in the profile 242 so that they are re-synchronized with respect to the Hall signal edge 408 data.

Exemplary Methods

Example methods for implementing adaptive feed forward spindle speed control in a disc media marking system will now be described with primary reference to the flow diagrams of FIGS. 6–10. The methods apply generally to the exemplary embodiments discussed above with respect to FIGS. 1–5. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM), a read-only memory (ROM), an erasable programmable-read-only memory (EPROM or Flash memory), an optical fiber (optical), and a portable compact disc read-only memory (CDROM) (optical).

Figure 6:
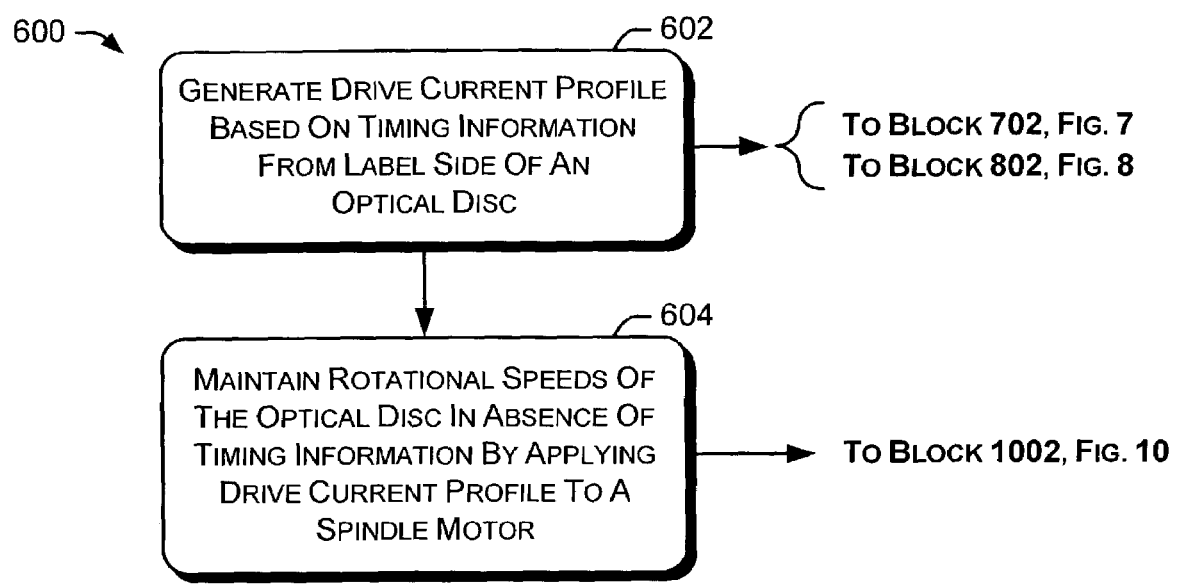
FIGS. 6–10 are flow diagrams illustrating exemplary methods for implementing adaptive feed forward spindle speed control in a disc media marking system.

FIG. 6 shows an exemplary method 600 for implementing adaptive feed forward spindle speed control in a disc media marking system. At block 602, a disc drive system 128 generates a drive current profile 242 based on timing information from the label side of an optical media disc 218. The timing information is generated from a finely incremented reflectivity pattern 300 typically located at the inner diameter 302 of the optical disc 218. The small increments of the reflectivity pattern 300 help to generate timing information comprising relatively temporally minute clock pulses that provide a way to control the speed of the spindle 236 down to very low rotational speeds, such as those desired during the labeling of the label side 216 of the optical disc 218.

The drive current profile 242 generally provides a recorded history of drive current values applied to a spindle motor 220 during a learning phase to maintain a particular rotational speed (e.g., a low rotational speed) of the optical disc 218 and spindle 236 on which the disc 218 is mounted. As discussed below in a subsequent exemplary method 700, in addition to the recorded drive current values actually applied to the spindle motor 220 during the learning phase, the drive current profile 242 includes additional interpolated drive current values that are calculated based on the recorded drive current values and varying radial increments of disc 218 between its inner diameter 302 and its outer diameter 304. The interpolated drive current values are typically calculated to produce (i.e., via spindle motor 220) rotational spindle speeds at each radial increment that maintain a constant linear velocity desired for labeling the label side 216 of the optical disc 218.

At block 604 of the exemplary method 600, the disc drive system 128 maintains rotational speeds of the optical disc 218 by applying the drive current profile 242 to a spindle motor 220. A spindle driver 234 applies drive currents from the drive current profile 242 to the spindle motor 220 to maintain desired rotational spindle speeds in the absence of the timing information. When the disc drive system 128 is performing a labeling process on the label side 216 of the optical disc 218, it no longer has access to the reflectivity signal 300 used to generate fine timing information. Thus, the drive current profile 242 is used to drive the spindle motor 220 and produce rotational spindle speeds at each radial increment of the disc 218 that, typically, maintain a constant linear velocity between the label surface 216 of optical disc 218 and a laser beam 214 that is desired for labeling the optical disc 218.

Figure 7:
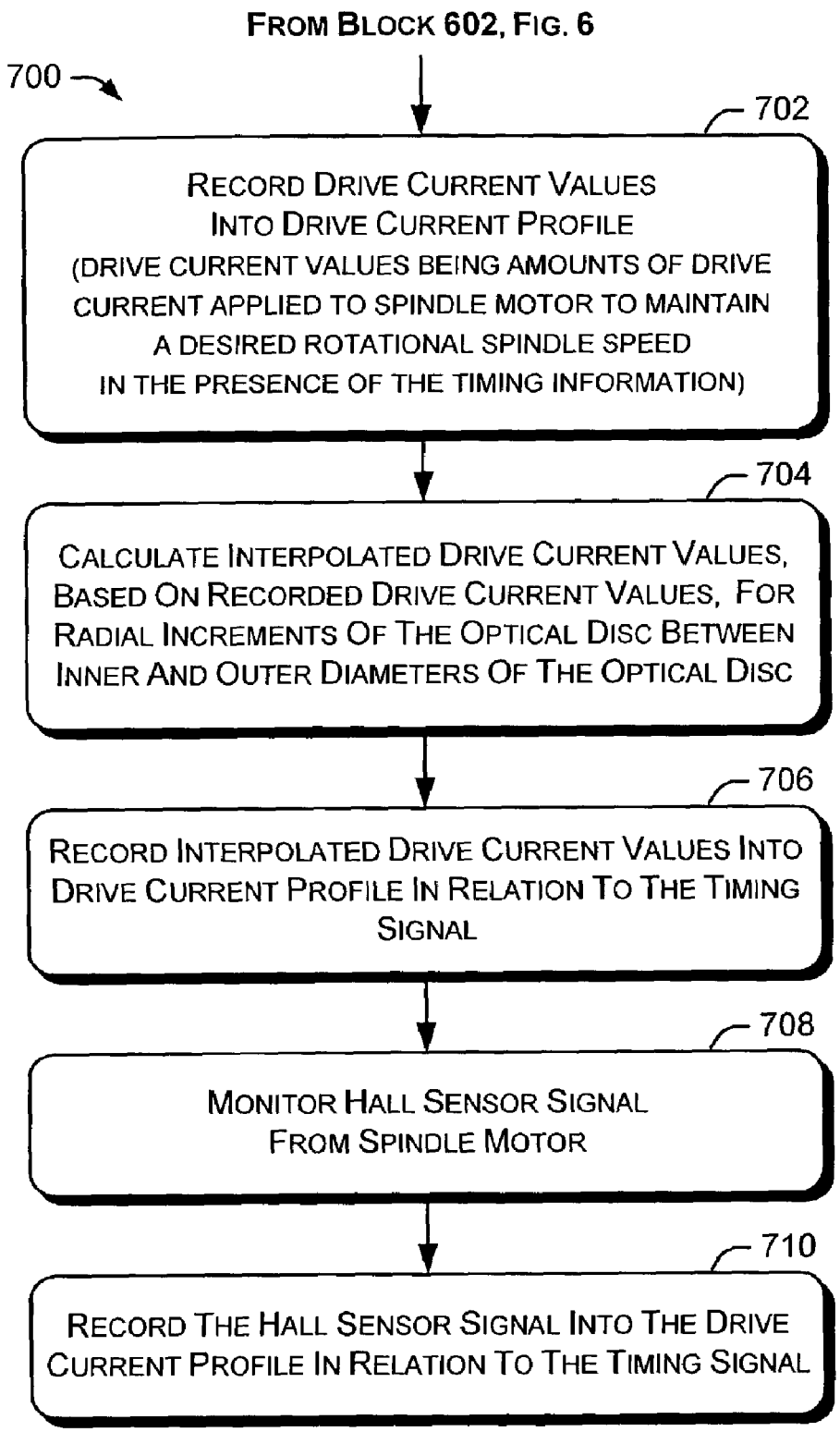

FIG. 7 shows an exemplary method 700 that may be part of the exemplary method 600 for implementing adaptive feed forward spindle speed control in a disc media marking system. Method 700 is therefore referred to from block 602 of method 600. The exemplary method 700 is generally performed during a learning phase of a disc drive system 128 wherein there is access to a reflectivity pattern 300 located on the label side 216 of optical disc 218. At block 702, a disc drive system 128 records drive current values into a drive current profile 242. The recorded drive current values are the amounts of drive current applied to the spindle motor 220 to maintain a desired rotational spindle speed (e.g., a low rotational speed) in the presence of the timing information (i.e., during a learning phase when there is access to a reflectivity pattern 300 on disc 218).

At block 704 of the exemplary method 700, interpolated drive current values are calculated based on the recorded drive current values and varying radial increments of disc 218 between its inner diameter 302 and its outer diameter 304. The interpolated drive current values are typically calculated to produce (i.e., via spindle motor 220) rotational spindle speeds at each radial increment that maintain a constant linear velocity between the label surface 216 of optical disc 218 and a laser beam 214 suitable for labeling the optical disc 218. At block 706, the interpolated drive current values are recorded into the drive current profile 242 in relation to the timing signal. Thus, an interpolated drive current value is recorded in the profile 242 in association with each increment of the timing signal.

At block 708, a Hall sensor signal from the spindle motor 220 is monitored. Hall sensor signal edges are associated with angular positions of the spindle 236 on which the optical disc 218 rotates. Therefore, the Hall sensor signal can be recorded into the drive current profile 242 to provide reference points that synchronize the drive current values recorded in the profile 242 to angular positions of the spindle 236. Accordingly, at block 710, the Hall sensor signal is recorded into the drive current profile 242 in relation to the timing signal.

Figure 8:
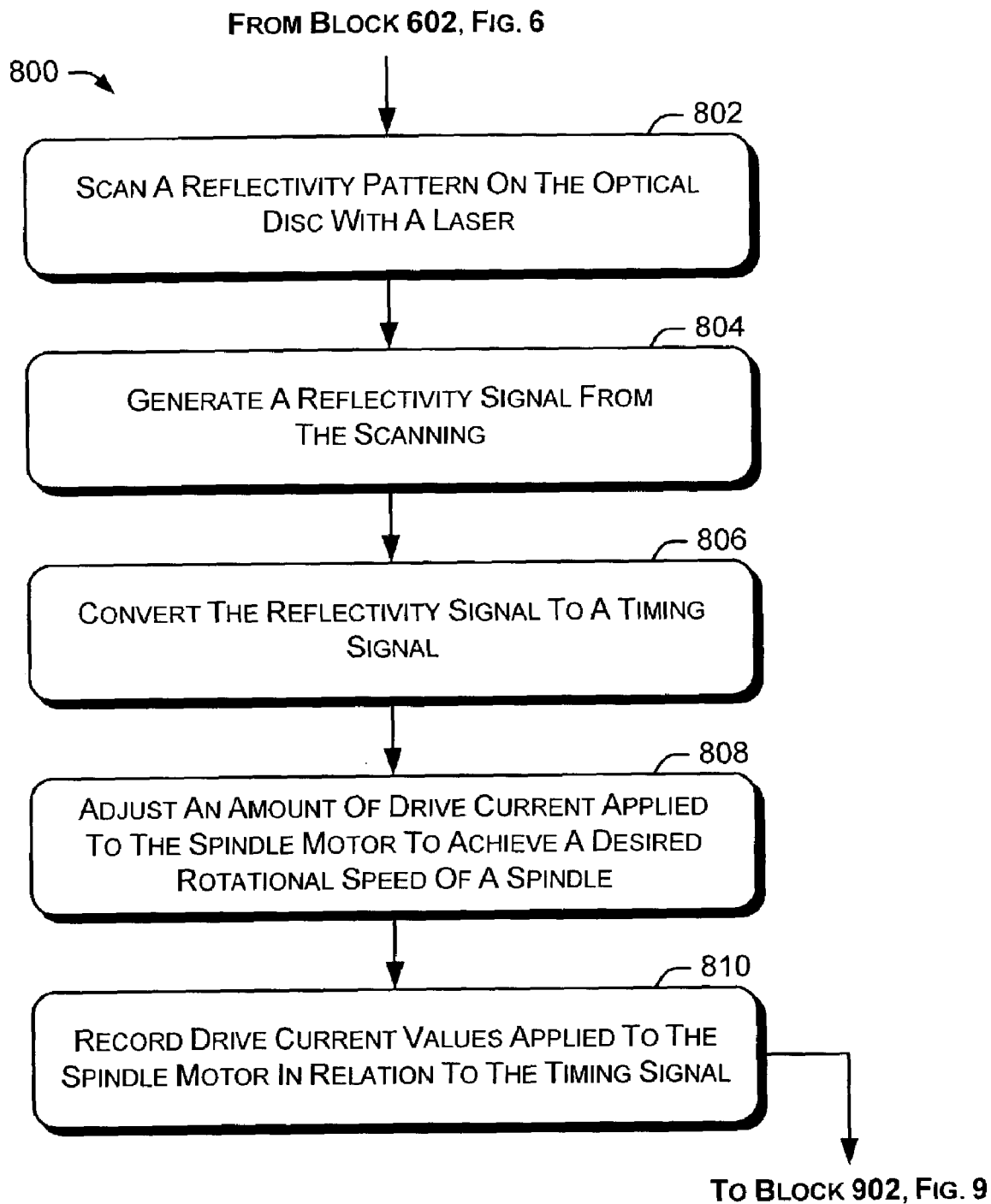

FIG. 8 shows an exemplary method 800 that may be part of the exemplary method 600 for implementing adaptive feed forward spindle speed control in a disc media marking system. Method 800 is therefore referred to from block 602 of method 600. The exemplary method 800 is generally performed during a learning phase of a disc drive system 128 wherein there is access to a reflectivity pattern 300 located on the label side 216 of optical disc 218. At block 802 of method 800, a disc drive system 128 scans a reflectivity pattern 300 on the optical disc 218 with a laser 206 (i.e., a laser beam 214). The scanning of optical disc 218 includes rotating the disc 218, shining the laser beam on the reflectivity pattern as the label side 216 of the disc 218 rotates past the laser, and receiving (i.e., with optical pickup unit 208) the reflected light returning from the reflectivity pattern 300 on the disc 218.

At block 804, an optical pickup unit (OPU) 208 of the disc drive system 128 generates a reflectivity signal from the scan. The reflectivity signal is a sum signal that is generated based on the combined reflected light received from a number of elements of the OPU 208. At block 806, the reflectivity signal is converted to a timing signal. This conversion may be performed, for example, by comparator circuitry located in OPU 208. At block 808, the amount of drive current applied to the spindle motor 220 is adjusted to achieve a desired rotational speed (e.g., a low rotational speed) of the spindle 236. Adjusting the amount of drive current applied to the spindle motor 220 to achieve a desired rotational speed includes determining the present rotational speed of the spindle 236. An error is then calculated between the present rotational speed and a desired rotational speed. The drive current applied to the spindle motor 220 is then altered (e.g., typically increased) until the error drops substantially to zero.

At block 810, drive current values are recorded into the drive current profile 242 in relation to the timing signal. In general, at each clock edge of the timing signal, the drive current value being used to drive the spindle motor 220 to achieve the desired rotational speed is recorded in association with that clock edge. As discussed below with reference to the method 900 of FIG. 9, the recorded drive current value is typically an average of several sample values taken during a learning phase of the disc drive system 128.

Figure 9:
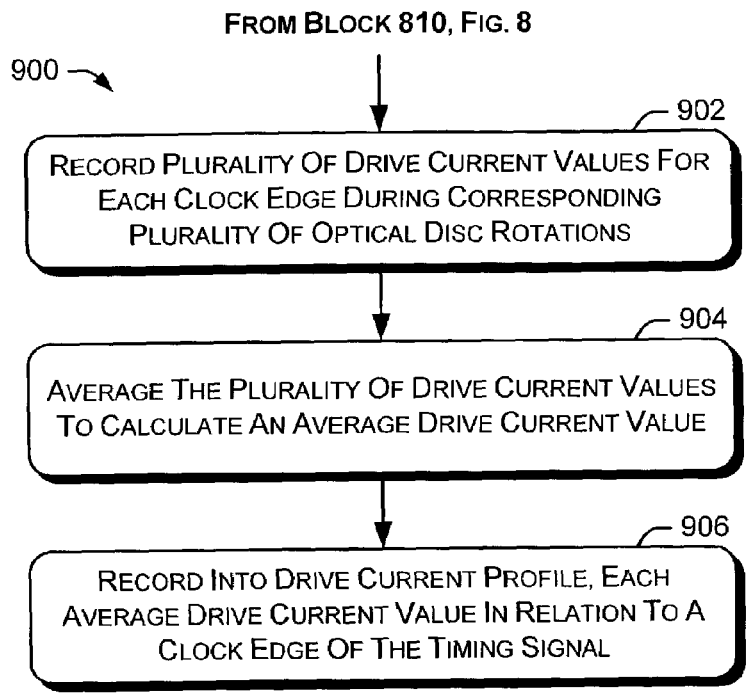

FIG. 9 shows an exemplary method 900 of recording drive current values that may be part of the exemplary method 600 for implementing adaptive feed forward spindle speed control in a disc media marking system. Method 900 is therefore referred to from block 810 of method 800. The exemplary method 900 is generally performed during a learning phase of a disc drive system 128 wherein there is access to a reflectivity pattern 300 located on the label side 216 of optical disc 218. At block 902 of method 900, a disc drive system 128 records a plurality of drive current values associated with each clock edge of a timing signal generated from a reflectivity pattern 300. Each of the plurality of drive current values corresponds with one rotation of a plurality of rotations of the optical disc 218 during a learning phase of the disc drive system 128. At block 904, the plurality of drive currents for each clock edge is averaged to calculate an average drive current value for that clock edge. At block 906, the average drive current value is recorded into the drive current profile 242 in relation to a corresponding clock edge of the timing signal.

Figure 10:
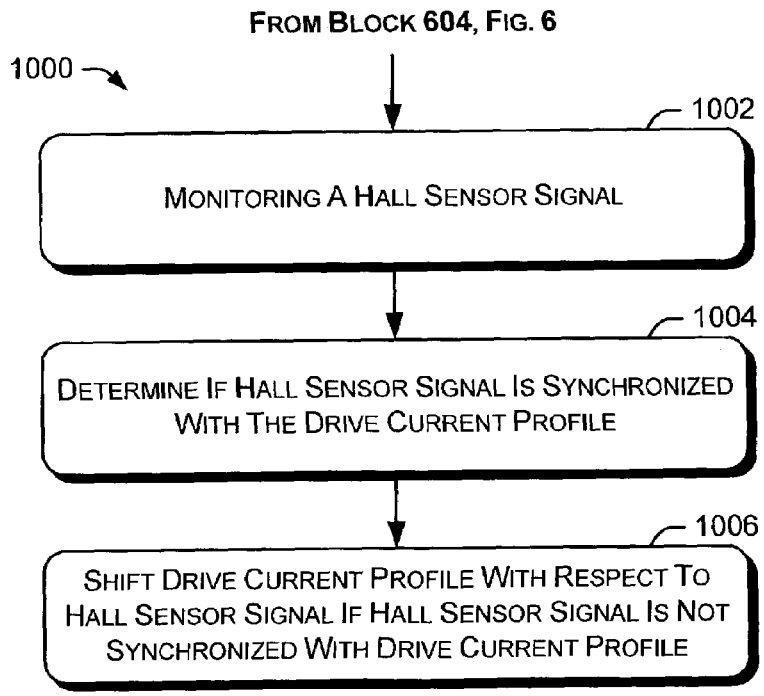

FIG. 10 shows an exemplary method 1000 that may be part of the exemplary method 600 for implementing adaptive feed forward spindle speed control in a disc media marking system. Method 1000 is therefore referred to from block 604 of method 600. The exemplary method 1000 is generally performed after a learning phase of a disc drive system 128 wherein there is no longer access to a reflectivity pattern 300 located on the label side 216 of optical disc 218. Thus, the exemplary method 1000 is generally performed during labeling of the label side 216 of optical disc 218. At block 1002, a disc drive system 128 monitors a real-time Hall sensor signal coming from a spindle motor 220. At block 1004, a spindle driver 234 of disc drive system 128 determines if the real-time Hall sensor signal is synchronized with the drive current profile 242. The determination generally includes comparing the real-time Hall sensor signal edges with Hall sensor signal edges that have been previously recorded into the drive current profile 242 during a learning phase, as discussed above regarding method 700 of FIG. 7. At block 1006, if the real-time Hall sensor signal is not synchronized with the drive current profile 242, the spindle driver 234 shifts the drive current profile with respect to the real-time Hall sensor signal.

Shifting the drive current profile 242 may include advancing or delaying the application of drive current values in the profile 242 to spindle motor 220. For example, a current value (e.g., $C_{00}$–$C_{ON}$, FIG. 5) with a corresponding clock edge 404 (e.g., $CK_1$–$CK_N$ FIG. 5,) in drive current profile 242 may be applied to spindle motor 220 somewhat before or somewhat after its corresponding clock edge 404 in order to properly synchronize the drive current value with the real-time Hall signal edge being received by the spindle driver 234. The advance or delay in application of the drive current value to the spindle motor 220 thereafter also affects the application of subsequent drive current values from drive current profile 242. Thus, the spindle driver 234 shifts the drive current values in the profile 242 so that they are re-synchronized with respect to the real-time Hall signal edges.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A processor-readable medium comprising processor-executable instructions configured for:
   generating a drive current profile based on timing information from a label side of an optical disc; and
   maintaining rotational speeds of the optical disc in absence of the timing information by applying the drive current profile to a spindle motor.

2. A processor-readable medium as recited in claim 1, wherein the generating comprises recording drive current values into the drive current profile in relation to the timing information, the drive current values being amounts of drive current applied to the spindle motor to maintain a desired rotational spindle speed in the presence of the timing information.

3. A processor-readable medium as recited in claim 2, wherein the generating comprises:

calculating interpolated drive current values for radial increments of the optical disc between an inner diameter and an outer diameter of the optical disc, the interpolated drive current values calculated based on recorded drive current values; and
recording the interpolated drive current values into the drive current profile in relation to the timing information.

4. A processor-readable medium as recited in claim 1, wherein the generating comprises:
   monitoring a Hall sensor signal; and
   recording the Hall sensor signal into the drive current profile in relation to the timing information.

5. A processor-readable medium as recited in claim 1, wherein the generating comprises:
   scanning a reflectivity pattern on the optical disc with a laser;
   generating a reflectivity signal from the scanning;
   converting the reflectivity signal to the timing information;
   adjusting an amount of drive current applied to the spindle motor to achieve a desired rotational speed of a spindle; and
   recording drive current values applied to the spindle motor in relation to the timing information.

6. A processor-readable medium as recited in claim 5, wherein the recording comprises recording into the drive current profile, each drive current value in relation to a clock edge of the timing information.

7. A processor-readable medium as recited in claim 5, wherein each drive current value is an average drive current value, the recording comprising:
   for each clock edge of the timing information, recording a plurality of drive current values during a corresponding plurality of rotations of the optical disc;
   averaging the plurality of drive current values to calculate an average drive current value; and
   recording into the drive current profile, each average drive current value in relation to a clock edge of the timing information.

8. A processor-readable medium as recited in claim 5, wherein the scanning comprises:
   rotating the optical disc;
   shining the laser on the reflectivity pattern as the optical disc rotates; and
   receiving light that reflects back from the reflectivity pattern.

9. A processor-readable medium as recited in claim 8, wherein the generating a reflectivity signal comprises generating a sum signal based on the light that reflects back from the reflectivity pattern.

10. A processor-readable medium as recited in claim 5, wherein the adjusting comprises:
    determining a present rotational speed based on the timing information;
    calculating an error between the present rotational speed and the desired rotational speed; and
    altering the amount of drive current applied to the spindle motor to remove the error between the present rotational speed and the desired rotational speed.

11. A processor-readable medium as recited in claim 1, wherein the maintaining rotational speeds comprises:
    monitoring a Hall sensor signal;
    determining if the Hall sensor signal is synchronized with the drive current profile; and shifting the drive current profile with respect to the Hall sensor signal if the Hall sensor signal is not synchronized with the drive current profile.

12. A processor-readable medium as recited in claim 11, wherein the determining comprises comparing an edge of the Hall sensor signal with a corresponding Hall sensor signal edge previously recorded into the drive current profile.

13. A processor-readable medium as recited in claim 1, wherein the rotational speeds vary according to a radial increment of the optical disc such that a constant linear velocity is maintained between a label surface of the optical disc and a laser during labeling of the optical disc.

14. A method comprising:
generating a drive current profile when a laser has access to timing information from a label side of an optical disc; and
applying the drive current profile to a spindle motor to achieve rotational speeds of the optical disc when the laser no longer has access to the timing information.

15. A method as recited in claim 14, wherein the generating a drive current profile comprises:
generating the timing information from a reflectivity pattern on the label side of the optical disc;
converting the timing information into a timing signal; and
for each pulse of the timing signal, recording a drive current value applied to the spindle motor to maintain a particular rotational speed.

16. A method as recited in claim 15, wherein the generating a drive current profile further comprises:
receiving a Hall sensor signal from the spindle motor; and
recording Hall sensor signal edges in the drive current profile relative to pulses of the timing signal.

17. A method as recited in claim 14, wherein the applying the drive current profile comprises:
monitoring a Hall sensor signal from the spindle motor;
determining if Hall sensor signal edge data from the Hall sensor signal is synchronized with recorded Hall sensor signal edge data present in the drive current profile; and
shifting the drive current profile with respect to the Hall sensor signal if the Hall sensor signal edge data is not synchronized with the recorded Hall sensor signal edge data present in the drive current profile.

18. A disc drive system comprising:
a laser configured to render an image on the label side of an optical media disc;
a spindle motor to rotate a spindle on which the optical media disc is mounted; and
a spindle driver configured to control an amount of drive current applied to the spindle motor during a learning phase to achieve a desired rotational speed of the spindle based on timing information derived from a reflectivity pattern on the label side of the optical media disc.

19. A disc drive system as recited in claim 18, further comprising a learning algorithm configured to record drive current values applied to the spindle motor and Hall sensor signal data received from the spindle motor in relation to the timing information during the learning phase.

20. A disc drive system as recited in claim 19, further comprising a drive current profile that includes the drive current values, the Hall sensor signal data and the timing information recorded during the learning phase, the spindle driver being further configured to apply the drive current profile to the spindle motor after the learning phase in order to achieve appropriate rotational speeds of the spindle as the laser renders an image on the label side of the optical disc.

21. An optical disc read-write device comprising the disc drive system as recited in claim 18.

22. A disc drive system comprising:
a learning algorithm configured to generate a drive current profile during a learning phase, the drive current profile including an average drive current value associated with each edge of a clock signal derived from a reflectivity pattern on the label side of an optical disc;
a spindle driver configured to apply the drive current profile to a spindle motor to achieve desired rotational spindle speeds during labeling of the label side of the optical disc when the reflectivity pattern is no longer accessible.

23. A disc drive system comprising:
means for reading timing information from a label side of an optical disc;
means for achieving a rotational speed based on the timing information;
means for generating a drive current profile that includes drive current values applied to a spindle motor to achieve the rotational speed; and
means for applying the drive current profile to the spindle motor to achieve desired rotational speeds in the absence of the timing information.

24. A disc drive system as recited in claim 23, wherein the drive current values are average drive current values and the means for generating a drive current profile comprise:
means for recording a number of drive current values associated with each signal edge in the timing information during each of a number of rotations of the optical disc;
means for averaging the number of drive current values associated with each signal edge to calculate an average drive current value; and
means for recording in the drive current profile, an average drive current associated with each signal edge.

25. A disc drive system as recited in claim 23, wherein the means for generating comprise:
means for monitoring a Hall sensor signal; and
means for recording the Hall sensor signal in the drive current profile relative to the timing signal.

26. A disc drive system as recited in claim 23, wherein the means for generating further comprises:
means for calculating interpolated drive current values for radial increments of the optical disc between an inner diameter and an outer diameter of the optical disc, the interpolated drive current values based on the drive current values applied to the spindle motor to achieve the rotational speed; and
means for recording the interpolated drive current values in the drive current profile.

27. A disc drive system comprising:
means for generating a drive current profile based on timing information from a label side of an optical disc; and
means for maintaining rotational speeds of the optical disc in absence of the timing information by applying the drive current profile to a spindle motor.

28. A disc drive system as recited in claim 27, wherein the means for maintaining rotational speeds comprise:
means for monitoring a Hall sensor signal during labeling of the optical disc;
means for determining if the Hall sensor signal is synchronized with the drive current profile; and means for shifting the drive current profile with respect to the Hall sensor signal if the Hall sensor signal is not synchronized with the drive current profile.

29. A disc drive system as recited in claim 27, wherein the means for generating a drive current profile comprises a learning algorithm configured to generate the drive current profile in the presence of the timing information.

30. A disc drive system as recited in claim 27, wherein the means for maintaining rotational speeds of the optical disc comprises a spindle driver configured to apply the drive current profile to the spindle motor in absence of the timing information.

31. A disc system comprising a disc drive system configured to control rotational speed of an optical disc in the absence or timing information based on a drive current profile that includes drive current values determined in the presence of the timing information.

32. A disc system as recited in claim 31, further comprising a learning algorithm configured as part of the disc drive system to record the drive current values into the drive current profile in relation to the timing information.

33. A disc system as recited in claim 31, further comprising a spindle driver configured as part of the disc drive system to apply the drive current profile to a spindle motor in synchronization with a Hall sensor signal received from the spindle motor.

* * * * *

UNITED STATES PATENT AND TRADEMARK OFFICE
CERTIFICATE OF CORRECTION

PATENT NO. : 7,196,715 B2  Page 1 of 1
APPLICATION NO. : 10/454567
DATED : March 27, 2007
INVENTOR(S) : Darwin Mitchel Hanks It is certified that error appears in the above-identified patent and that said Letters Patent is hereby corrected as shown below:

In column 18, line 1, in Claim 31, delete "or" and insert -- of --, therefor.

Signed and Sealed this

Eighteenth Day of August, 2009

David J. Kappos
*Director of the United States Patent and Trademark Office*